United States Patent

Nelson

[15] 3,659,356
[45] May 2, 1972

[54] ELEMENT MATCHING DEVICE

[72] Inventor: Roy A. Nelson, 25 Oakwood Road, Acton, Mass. 01720

[22] Filed: June 30, 1970

[21] Appl. No.: 51,177

[52] U.S. Cl. ............................................. 35/35 D, 35/9 D
[51] Int. Cl. .................................................... G09b 5/02
[58] Field of Search ............... 35/9 R, 9 D, 35 D, 48 R, 48 A

[56] References Cited

UNITED STATES PATENTS

| | | | |
|---|---|---|---|
| 2,838,847 | 6/1958 | Zalkind | 35/9 R |
| 2,505,230 | 4/1950 | Composto | 35/35 D |
| 1,629,635 | 5/1927 | Parsons | 35/9 R |

Primary Examiner—Wm. H. Grieb
Attorney—Martin Kirkpatrick

[57] ABSTRACT

Element unit having coded aperture array and visible element indicia is matched to control unit having compatibly coded aperture array and visible control indicia by placing element unit and control unit in fixed mutual spatial relationship in which apertures of compatibly coded arrays cooperate to form one or more continuous paths for a signal. An indicator is actuated in response to a signal received after traversing continuous paths, and element and control indicia remain visible while units are matched.

14 Claims, 14 Drawing Figures

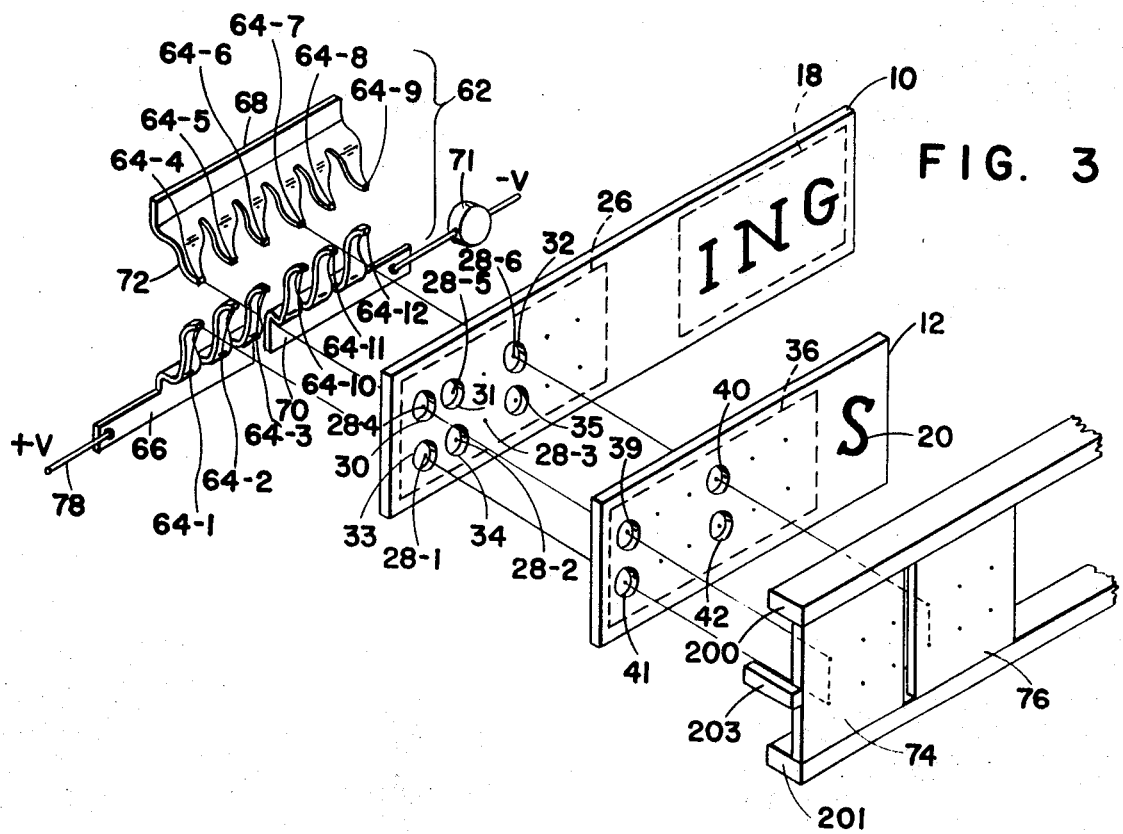
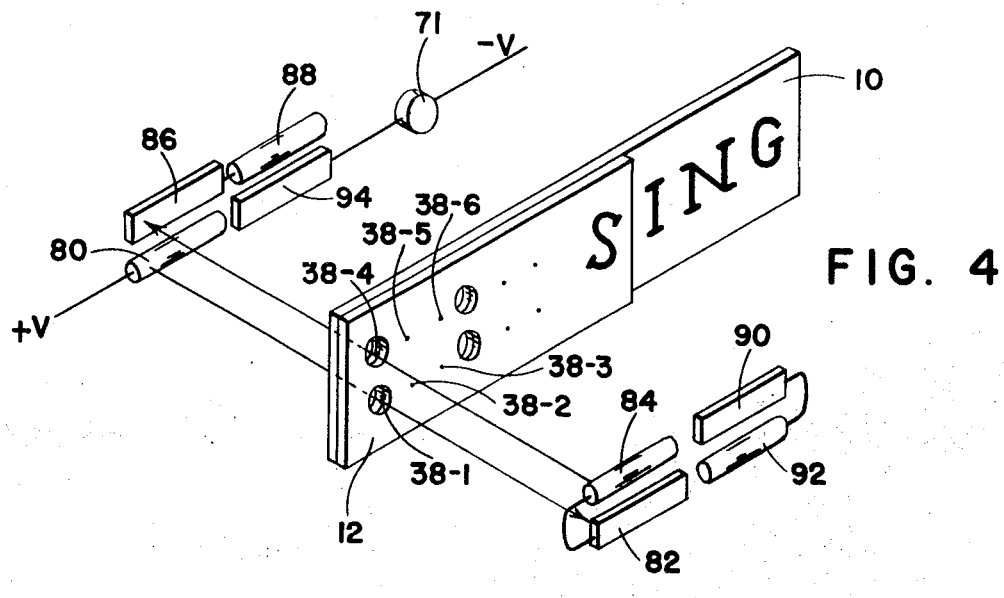

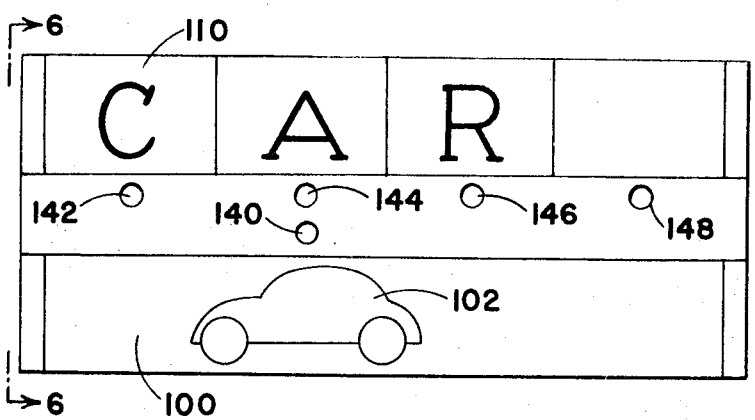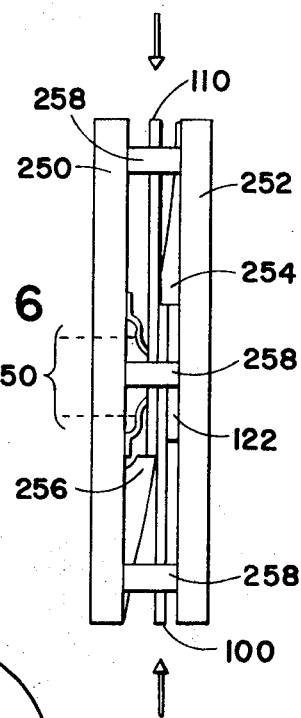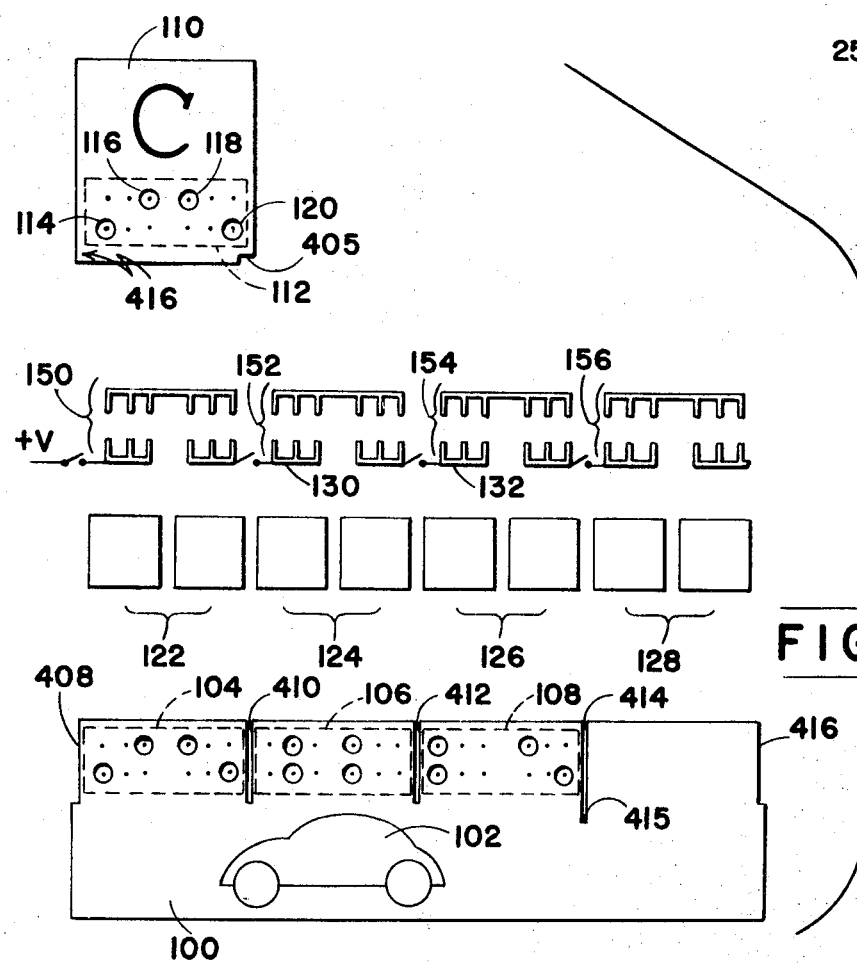

ELEMENT MATCHING DEVICE

This invention relates to an educational device for teaching spelling and reading. In particular, this invention aids in such teaching by providing a reward for the correct selection of a letter to complete a word, a portion of which is given, or alternatively by providing a reward for the correct selection of each letter in the sequence of letters that spell a designated word, with a further reward for completing the word.

This device provides an opportunity for a student to work individually, without supervision, and at his own pace. The device provides preformed letters for use by children too young to have the manual dexterity to form letters accurately, but able to learn to spell and read simple words. It supplies a variety of new tasks, and reinforces acquired knowledge by rewarding success in repeating the spelling of known words. The invention provides immediate encouragement at each successfully completed stage of the task, and immediate indication of which portion of the attempted solution is in error. In addition, the device has inexhaustible patience, will reward successes as often as they are achieved, and will wait as long as the student requires for each step to be completed.

The logical decisions involved in the operation of the device are mechanically determined by the removable portions of the device, which contain no electrical or conducting elements. Therefore these portions are cheaply and simply manufactured of a single material; in addition, all electrical parts of the device are kept out of reach of the user. No mechanical moving parts are involved in the operation, so that the device will continue to work reliably over prolonged periods of use. Although the logical decisions are determined by the mechanical structure of the removable portions, all such removable portions, representing both correct and incorrect decisions, are physically accommodated by the device. Thus information about the correctness of choice is not provided by mechanical fit or misfit.

The invention provides a device for matching at least one element unit to a control unit, and comprises one or more control units for determining the desired element units to be matched, and one or more element units to be matched to the control unit. The control unit provides visible control indicia indicating the elements to be selected by it, and provides one or more coded control arrays, each of which determines one or more desired elements. Each element unit provides visible indicia representing the element, and a coded element array. The device further includes alignment means for accurate superposition of the arrays, means for generating a signal and for directing the signal towards a control array, and cooperating signal receiving and indicator means; both control unit and element unit are generally impermeable to the signal. The coded control array provides at least one control aperture permeable to the signal, and the coded element array provides at least one similar aperture. The locations of the apertures within each array provide the coding. The element unit is used by placing it in a fixed spatial relationship to the control unit so that the apertures in a desired element array and the apertures in the control array meet and cooperate to form coincident paths for the signal; the control and element indicia remain visible while the element unit is in use.

In preferred embodiments, an electric current is employed as the signal, and the element units and control units are perforated non-conducting cards. Means for directing the signal towards the cooperating coded control and element arrays and for receiving the signal after it has traversed a continuous path, are provided by contact arrays including contact elements extending directly through the cooperating coded control and element perforations, and cooperating conducting segments, permitting a conducting path to be completed through the continuous apertures provided by the matched control and element arrays.

In a first preferred embodiment, element units represent letters, a control unit provides a portion of a word, and the control array is compatible with the element arrays of the several letters that combine with the word portion to form a complete word. In a second preferred embodiment, element units represent letters, and a control unit represents a complete word and provides a sequence of control arrays representing the sequence of letters that correctly spell that word. Each control array is compatible with a single element array corresponding to the correct letter in the sequence. An indicator light is actuated by the successful completion of a word in either embodiment, and in the second embodiment additional indicator lights reward each correct letter as it is selected and matched to the control unit.

In alternative embodiments, the signal is a light beam, and the element and control units are perforated opaque cards or opaque cards with transparent areas. Extended light sources and cooperating photocells direct the signal toward the arrays and receive it after it has traversed the cooperating element and control apertures.

In still other alternative embodiments, the apertures in the coded control array and those in the coded element array of a desired element unit are complementary, and when an element unit is correctly selected and positioned for cooperation with the control unit, the arrays combine to prevent the transmission of the signal, which may be an electric current, a beam of light, or a jet of air. In these embodiments, the interruption of the signal path actuates the indicators as each correct element is selected and matched to the control unit.

Other objects, features and advantages will appear from the following description of two preferred embodiments of the invention, taken together with the attached drawings thereof, in which:

FIG. 3 is an exploded view showing a control unit, a matching element unit, and portions of the signal directing and receiving means of the first preferred embodiment;

FIG. 4 is a schematic view of alternative signal directing and receiving means for an alternative first embodiment;

FIG. 5 is a front elevation of a second preferred embodiment of the invention;

FIG. 6 is a view taken along line 6—6 of FIG. 5;

FIG. 7 is a schematic view of the signal directing and receiving means of a second preferred embodiment, with face views of a control unit and an element unit;

Figure 1:
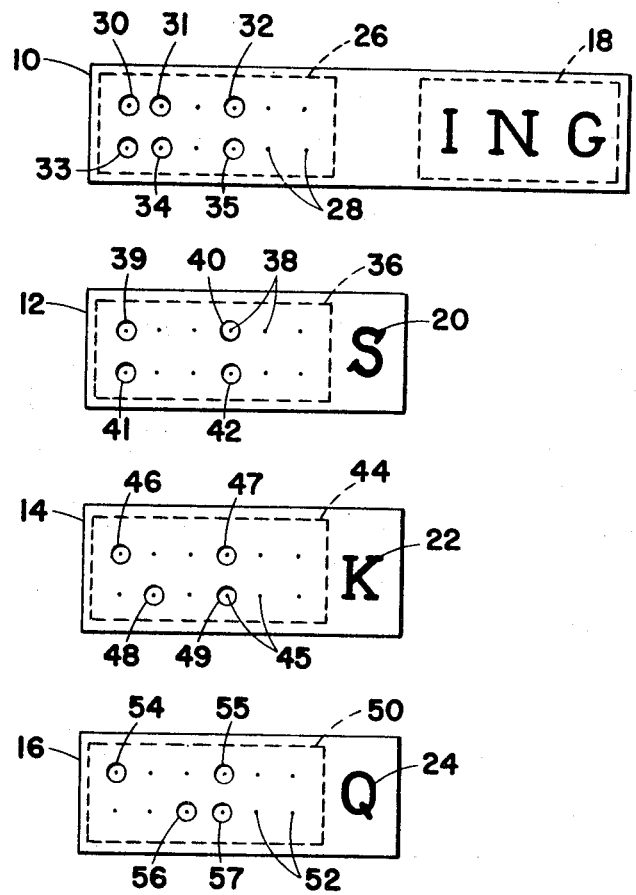
FIG. 1 shows a control unit and three element units of a first preferred embodiment of the invention.
Figure 2:
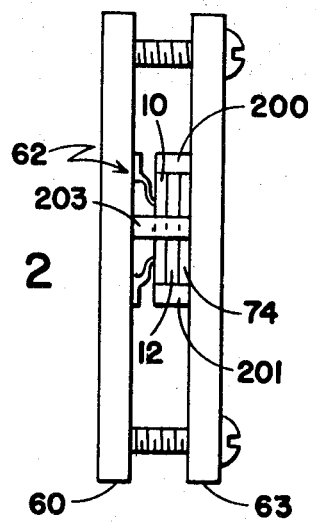
FIG. 2 is a side elevation of a first preferred embodiment of the invention.

One preferred embodiment of the invention is intended to aid in the teaching of reading and spelling by rewarding the completion of words of which a portion is given. In this embodiment, referring now to FIGS. 1, 2 and 3, each control unit determines at least one correct choice of an element and eliminates others as incorrect. The control unit in this embodiment is a non-conducting control card 10, which provides visible control indicia in the form of lettering 18, representing in this example the letters ING. A set of element units is provided, in the form of letter cards, each representing a letter of the English alphabet. In particular, letter cards 12, 14 and 16 represent the letters S, K and Q, and visible element indicia in the form of visible representations 20, 22 and 24 are provided on these cards.

Control card 10 provides coded control array 26, comprising 12 locations 28, and card 10 is perforated to provide six control apertures 30, 31, 32, 33, 34 and 35. Letter card 12 provides a coded element array 36, comprising 12 locations 38, spaced to correspond with locations 28 of control array 26, and is perforated to provide four element apertures 39, 40, 41 and 42. Similarly, letter card 14 provides coded element array 44, comprising 12 locations 45, and four element apertures 46, 47, 48 and 49; and letter card 16 provides coded element array 50, comprising 12 locations 52, and four element apertures 54, 55, 56 and 57.

In this embodiment, the signal used to detect the alignment of the coded array patterns is an electric current, and the signal directing and receiving means comprise a contact array and cooperating conducting segments.

A non-conducting base 60 supports a contact array 62, and a non-conducting cover 63 supports a pair of conducting segments 74 and 76, insulated from one another. Control card 10 and element card 12 are shown in use, placed between base 60 and cover 63 with coded element array 36 meeting and superimposed on control array 26. Alignment means, to ensure that the control and element cards are accurately positioned to superimpose their coded arrays, are provided by two side stops 200 and 201, carried on cover 63 and extending parallel to the long dimensions of the cards, and an end stop 203 extending between cover 63 and base 60.

Contact array 62 comprises twelve contact points 64 disposed in three sets 66, 68 and 70. The contact points of each set are electrically connected together, but each set is insulated from the other sets. Each contact point 68 is supported on a resilient support finger 72 and biased upwardly towards a conducting segment 74 of 76, so that when neither a control card nor a letter card is present, each contact point 64 normally engages a portion of a conducting segment.

A voltage source, not shown, is connected at 78 to set 66 of contact points. Thus, electric current normally flows from the source through set 66 and its contact points 64–1, 64–2 and 64–3 to conducting segment 74, through segment 74 to contact points 64–4, 64–5 and 64–6 of set 68, thence to points 64–7, 64–8 and 64–9 of the same set 68, and thence to conducting segment 76; the current then flows through segment 76 to set 70, and set 70 may then be connected to a suitable indicator 71, which is actuated in response to a completed electrical circuit as described.

As will be seen by reference to FIG. 3, when control card 10 is used, placing coded control array 26 between contact array 62 and conducting segments 74 and 76, contact point 64–1 is adjacent location 28–1 of control array 26, point 64–2 is adjacent location 28–2, and so on. Since aperture 33 is provided at location 28–1 of control array 26, contact point 64–1 is enabled to engage conducting segment 74. Aperture 30, provided at location 28–4 of control array 26, similarly enables point 64–4 to engage the same conducting segment 74, and thus electric contact is made through segment 74 between set 66 and set 68. Contact between these sets is also permitted by apertures 31 and 34. Aperture 32 enables point 64–7 to engage segment 76, and aperture 35 enables point 64–10 to engage the same segment, and electric contact is thereby completed between set 68 and set 70, completing a circuit through the array.

When letter card 12 is placed with its coded element array 36 superimposed on control array 26 of control card 10, it will be seen that aperture 41 on letter card 12 is adjacent aperture 33 on control card 10 and that apertures 41 and 43 meet to provide a coincident path, and similarly aperture 39 on the letter card is adjacent aperture 30 on the control card and meets it to form a coincident path. Thus contact points 64–1 and 64–4 are not prevented from engaging segment 74, and contact is maintained between contact sets 66 and 68, although no aperture on the letter card is provided adjacent either aperture 31 or 34. Apertures 40 and 42 similarly meet apertures 32 and 35 respectively to provide coincident paths, permitting contact to be maintained between sets 68 and 70.

Thus, when letter card 12, representing "S," is used with control card 10, representing "ING," the letters together form a complete word "SING," and the apertures together cooperate to permit an electric circuit to be completed through contact array 62, in order to actuate indicator 71.

Similarly, if letter card 14, representing "K" is used, the letters together represent the complete word "KING;" and it will be seen that aperture 48 of the letter card meets aperture 34 of the control card, permitting point 64–2 to extend directly through the coincident path to engage segment 74, while aperture 46 meets aperture 30, permitting point 64–4 to engage the same segment, completing contact between sets 66 and 68; apertures 47 and 49 of letter card 14 occupy the same relative positions as apertures 40 and 42 of letter card 12, and do not prevent contact between sets 68 and 70. Again, the electric circuit is completed.

However, if letter card 16, representing the letter "Q," is used, it will be seen that although aperture 54 on card 16 is adjacent aperture 30 of control card 10, enabling point 64–4 to engage segment 74, no aperture is provided adjacent either of apertures 33 and 34 of the control card. Thus neither point 64–1 nor point 64–2 can engage conducting segment 74, and no contact can be made between sets 66 and 68. As no circuit is completed, the indicator is not actuated. Coded array 26 of control card 10 rejects letter card 16, indicating that choice of this card is incorrect, and in fact "QING" does not form an English word.

Other letter cards, not shown, representing for example the letter "R" would be compatible with coded array 26 of control card 10, as provided for by aperture 31. On the other hand, cards representing, for example, the letter "U" would not be compatible, but would provide apertures at locations not adjacent apertures on the control card.

Figure 9:
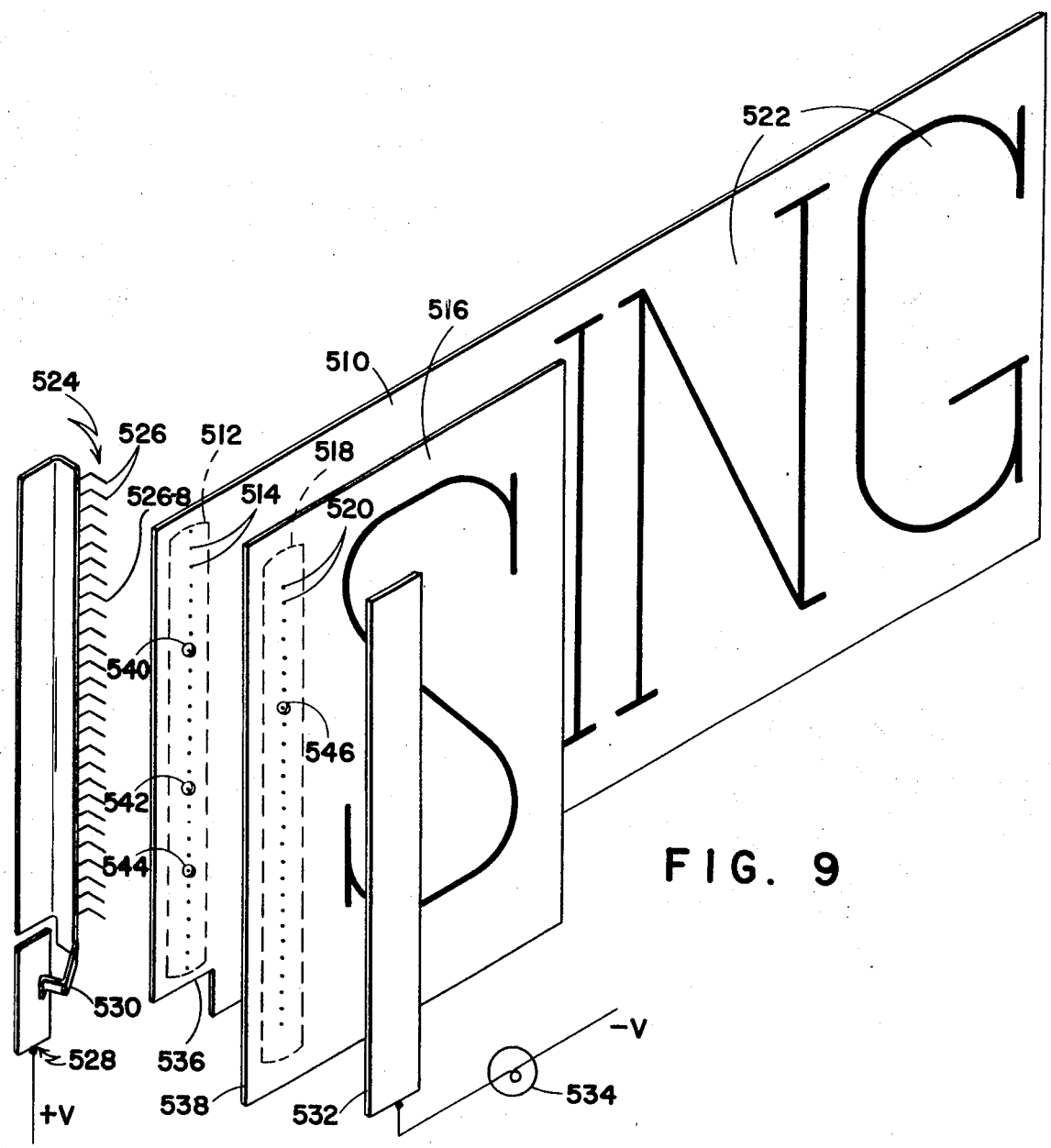
FIGS. 9 and 10 are an exploded view and a schematic view respectively of a first embodiment using an alternative arrangement of signal directing and receiving means.
Figure 10:
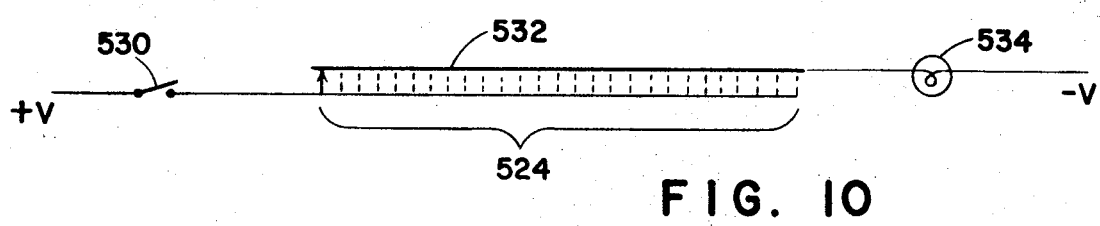

Still another embodiment of this invention, also used for the purpose of rewarding correct completion of words partially given (referring now to FIGS. 9 and 10), employs a control card 510 providing a linear control array 512 of 26 positions 514 and a set of element cards, each element card, for instance 516, providing a similar linear element array 518 of 26 positions 520. Control card 510 provided visible control indicia in the form of lettering 522, representing, as before, the letters ING, and the element cards each represent a letter of the alphabet.

In the particular form of this embodiment employing an electric current as the signal, a linear array 524 of electrically connected contact fingers 526 is provided on a non-conducting base. A voltage source, not shown, is connected to array 524 at 528, through a normally open switch 530. A conducting segment 532 is supported on a non-conducting cover, and is connected to an electrically actuated indicator 534. Non-conducting control card 510 provides a slot 536 adapted to accommodate switch 530, leaving it open when control card 510 is inserted, so that although the resilient upwardly biased contact fingers 526 engage conducting segment 532, no current reaches indicator 534. The non-conducting element cards do not provide a corresponding slot; therefore corner 538 of element card 516, inserted over control card 510, closes switch 530, connecting array 524 with the voltage source.

Coded control array 512 provides apertures 540, 542 and 544. Element card 516 provides a single aperture 546 located to correspond to aperture 540 of the control array. Thus when element card 516, representing the letter S, is used in the device, apertures 540 and 546 meet and cooperate to form a coincident path, permitting contact finger 526–8 to extend directly through the cooperating apertures and engage conducting segment 532, thus completing a circuit through indicator 534. Other element cards representing letters that combine with ING to form English words each provide an aperture in a location corresponding to one of the apertures in the coded control array, whereas element cards representing letters that do not so combine with ING will each provide an aperture in a location not corresponding to any of the apertures of the coded control array.

In this embodiment, either light or a stream of air might also be employed as a signal.

Another embodiment of this invention, used for the same purpose of rewarding correct completion of words partially given, utilizes a control card 10 and letter cards such as 14, 16 and 18, but the signal is visible light. Therefore the cards are required to be opaque to visible light rather than non-conducting, and the apertures may be either perforations or transparent portions, permitting light to travel through the card. In this embodiment, as shown in FIG. 4, the signal is generated by an extended light source 80, so disposed that light from it strikes locations 38–1, 38–2 and 38–3 of letter card 12, and no other locations; a photocell 82 is disposed to receive light from any of these locations. When photocell 82 is activated by receiving light, it in turn activates an extended light source 84, disposed to direct light towards locations 38–4, 38–5 and 38–6 of letter card 12, and no other locations, and a second photocell 86 receives such light. Light source 88 is activated in response to photocell 86, and photocell 90 is disposed to receive light from this source and to activate light source 92 in response. Finally, photocell 94 is activated by light from source 92 and in turn signals the indicator.

The light signal could also be employed with a system of mirrors or of light pipes to direct the light.

Another preferred embodiment of this invention aids in teaching the spelling of individual words by rewarding the successful spelling of the entire word, and in certain embodiments, by preliminarily rewarding each correctly selected letter in sequence, thus indicating which letter in a misspelled word is in error.

In this embodiment, a set of elements is provided, representing the letters of the English alphabet or the Initial Teaching Alphabet (although any foreign alphabet might also be used). Several control units are provided, each one a non-conducting card. Each control card determines a desired sequence of letters, the sequence spelling a particular word; each card provides visible control indicia in the form of a pictorial or other non-literal representation of the desired word (or the letters spelling the word in another language), and provides a sequence of coded control arrays, each determining one of the letters of the desired sequence. The element units are a set of non-conducting element cards, each providing visible element indicia in the form of a visible representation of the corresponding letter.

Referring now to FIGS. 5, 6, 7 and 8, a control card 100 represents the word "CAR" and provides a visible picture 102 of a car. Card 100 also provides a sequence of three coded control arrays 104, 106 and 108, each array comprising 12 locations as in the previously described embodiment. Element card 110, representing the letter "C," provides a single coded element array 112, with four apertures 114, 116, 118 and 120. The control and element cards are superimposed by sliding them in opposite directions into the space between base 250 and cover 252. Aligning means are provided by end aligners 254 and 256, carried on cover and base respectively, and three pairs of side aligners 258, only one set of which is shown in FIG. 6. When element array 112 is superimposed on control array 104, it will be seen that the aperture pattern of element array 112 and the aperture pattern of control array 104 meet to provide coincident apertures, while if element array 112 is superimposed on control array 106 or array 108, the respective element and control aperture patterns do not meet to provide coincident apertures.

In the preferred embodiment for teaching spelling of words, the signal employed is an electric current, and the signal directing and receiving means comprise a sequence of contact arrays and a cooperating sequence of conducting segments. The sequence may contain any number of arrays; in the embodiment shown in FIGS. 5, 7, and 8 there are four arrays 150, 152, 154 and 156 with four cooperating pairs of conducting segments, 122, 124, 126 and 128.

Figure 8:
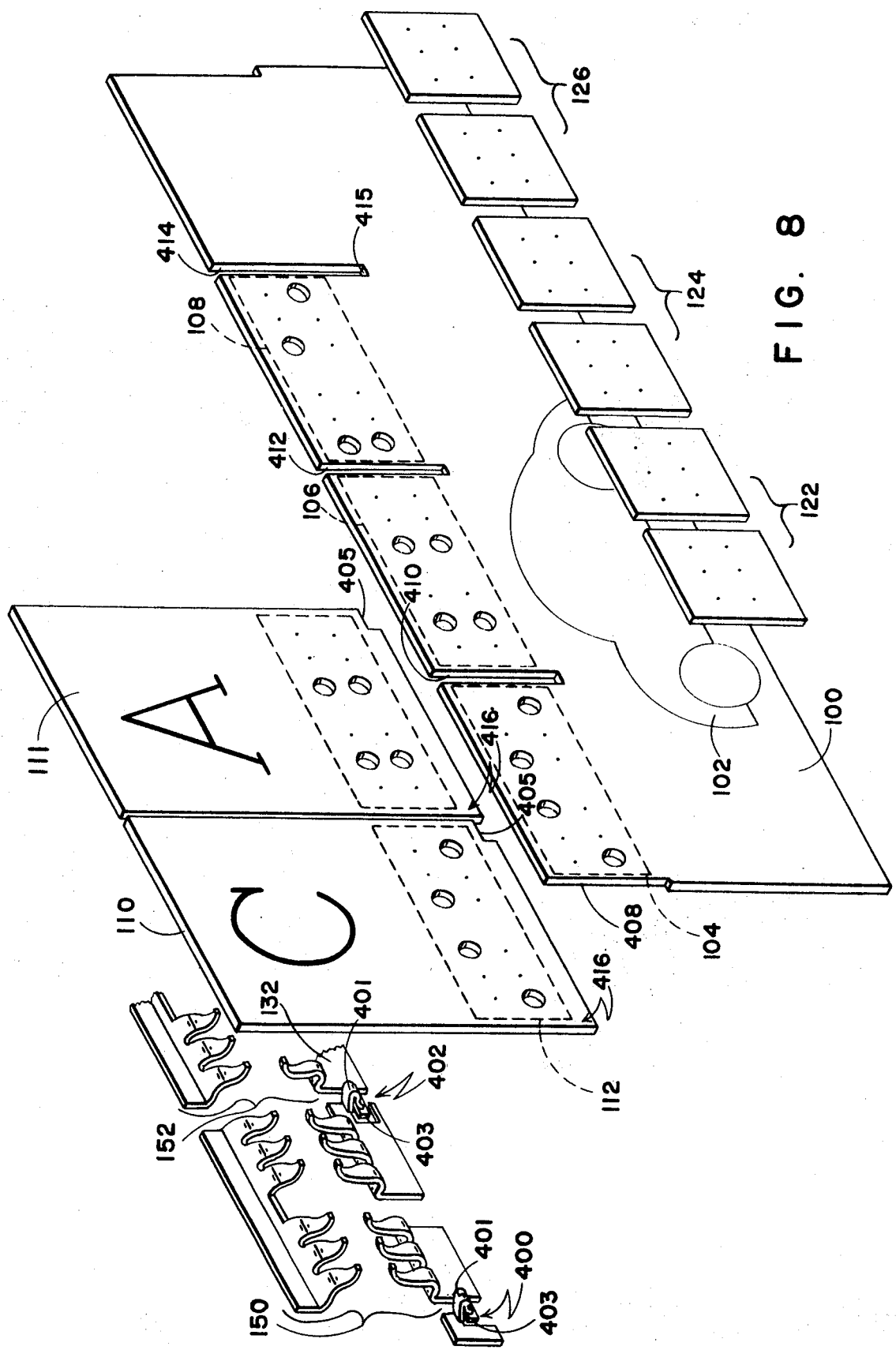
FIG. 8 is an exploded view of a control unit, two matching element units, and portions of the signal directing and receiving means of the second preferred embodiment.
Figure 12:
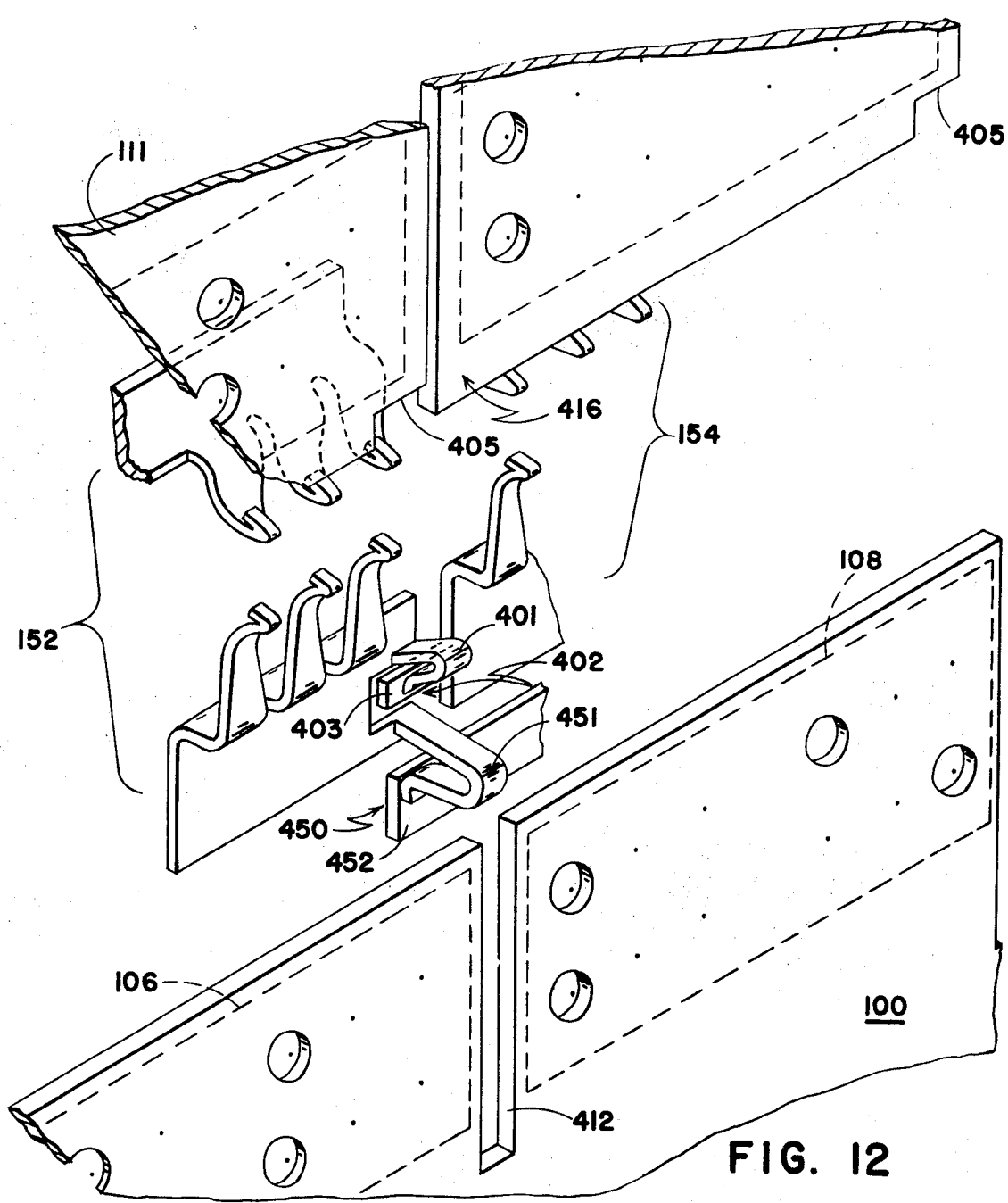
FIG. 12 is a detailed exploded view of a portion of the second preferred embodiment.

Since the resilient contact fingers of the contact arrays are upwardly biased for normal engagement of the corresponding conducting segments, they would provide a closed circuit between the voltage source and word indicator 140, regardless of the presence of letter cards. In order to ensure that the word indicator is actuated only when all the letter cards required to spell the word are in place, normally open switches 400, 402, 404, and 406 are provided. Referring particularly to FIGS. 8 and 12, each switch comprises a raised upwardly biased movable contact 401 and a fixed contact 403. Control card 100 has corresponding slots 408, 410, 412, 414 and 416 which ensure that control card 100 does not engage movable contact 401, thereby allowing these switches to remain open when control card 100 has been inserted; thus the word indicator remains inactive.

Referring to FIG. 8, when a letter card, as for instance card 110, is inserted into position with element array 112, meeting control array 104, corner 416 of card 110, by sliding over movable contact 401 of switch 400, forces it into engagement with fixed contact 403. If the letter card is correctly selected, as is card 110 for letter "C" shown in FIG. 8, contact finger of the corresponding contact array 150 extend directly through the coincident cooperating control and letter apertures to complete a conducting path in the manner previously described for the ING embodiment of the invention, movable contact 401 of switch 402 becomes live, and the insertion of a second letter card, by closing switch 402, continues the conducting path to the first set 132 of contacts in array 152. Each letter card has a cut-out portion 405 to prevent unintended closing of the switch leading to the next array. Thus only the insertion of correctly chosen letter cards in a complete sequence will permit the word indicator to be actuated.

Figure 11:
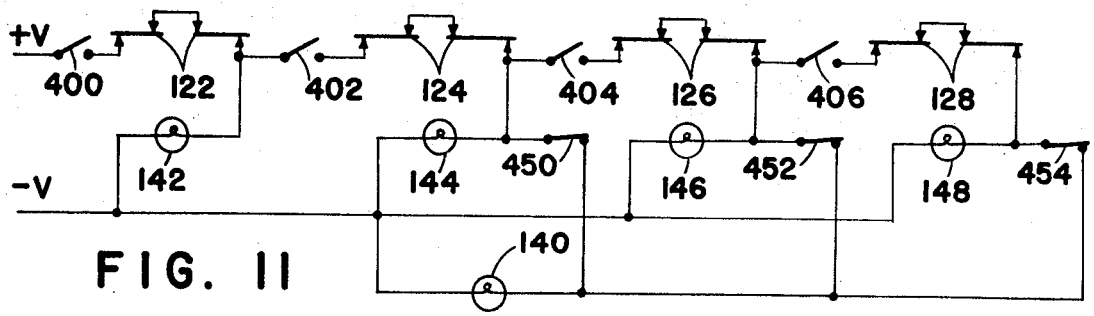
FIG. 11 shows a circuit diagram of the second preferred embodiment.

Additionally, letter indicators 142, 144, 146 and 148 may be provided, connected as shown in FIG. 11. The insertion of each correct letter card in sequence actuates the corresponding letter indicator, thus providing immediate confirmation of a correct choice, while an incorrect choice fails to actuate the corresponding letter indicator.

To provide for spelling words of varying length, any desired number of contact arrays may be provided on the base, with corresponding conducting segments on the cover; four are shown in the embodiment here described. Words of any length from two to four letters can be specified by the control card. Normally closed switch 450, comprising movable contact 451 and fixed contact 452 connects array 152 to word indicator 140; similarly, normally closed switches 452 and 454 connect arrays 154 and 156 with the word indicator. When a control card specifies a three-letter word, slot 414 on the control card is deepened at end 415, to allow card 100 to slide past switch 452, at the end of the third contact array 154, without opening it; since slots 412 and 416 are shallow, switches 450 and 454 are opened by control card 100. Thus the only current path from the voltage source to word indicator 140 is through switch 452, which remains closed; consequently indicator 140 is actuated only after three successive correct letters have been inserted but without inserting a fourth letter. A control cord specifying a four-letter word will have slot 416 deepened while slots 412 and 414 remain shallow, providing a current path through the fourth array to the word indicator.

This embodiment may be adapted for solution of a group of independent multiple-choice questions, which need not be answered in any sequence. In this form of the invention, each question provides a control array uniquely specifying an element array, but each element indicator is capable of being independently actuated by a correct choice of element. Thus a student is permitted to answer questions within his knowledge while leaving others unanswered. A control card provides precoded arrays specifying a group of answers; and a group of questions may be represented by the control card, separately printed as on a sheet of paper, and coded by number to the positions on the control card.

Figure 13:
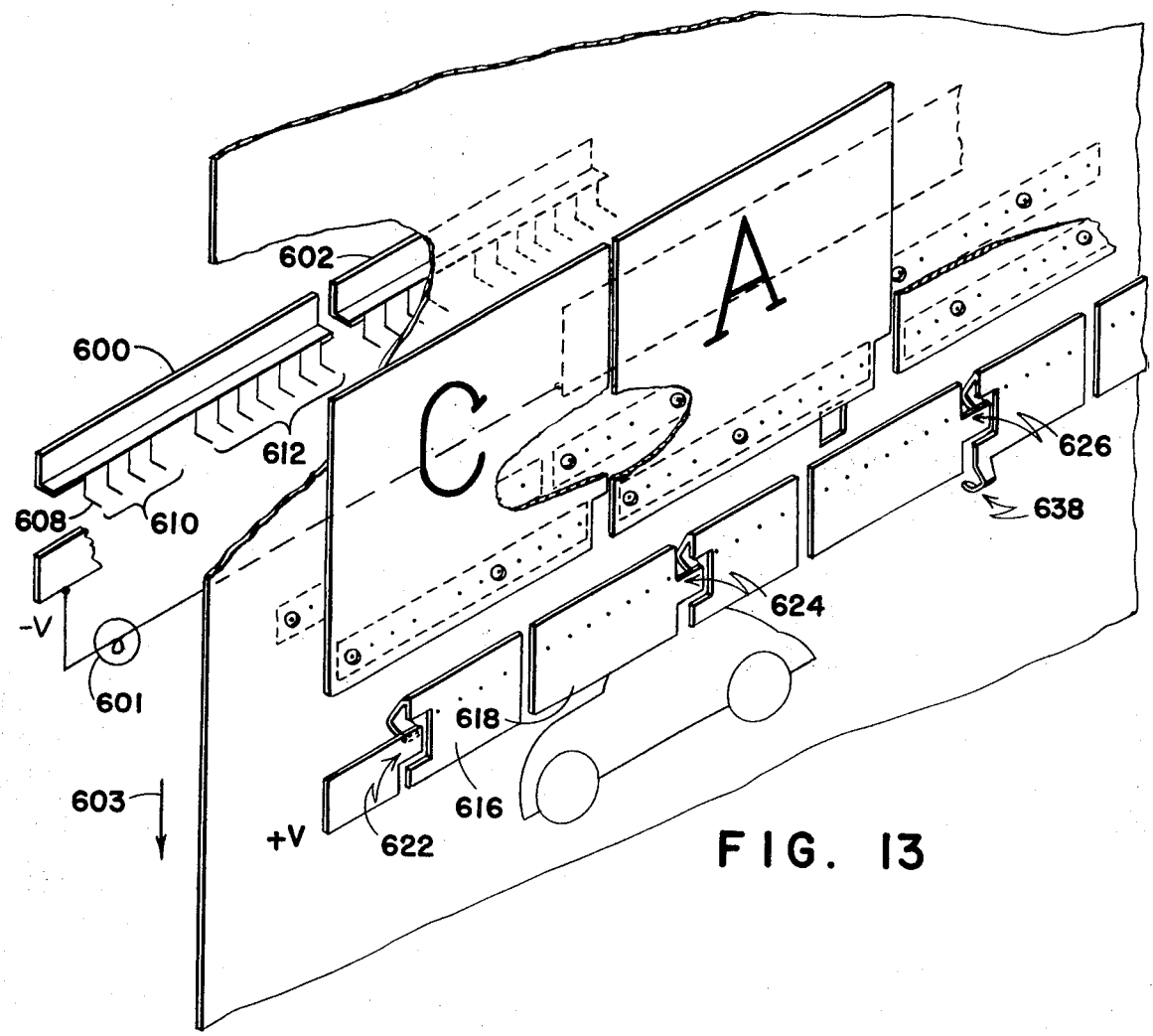
FIG. 13 is an exploded view, partially broken away, of a portion of the second preferred embodiment, using an alternative arrangement of signal directing and receiving means.
Figure 14:
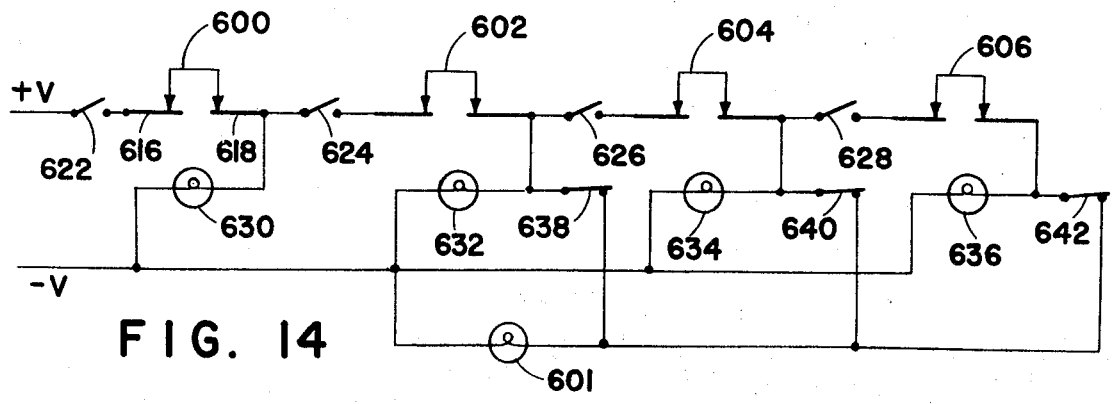
FIG. 14 is a circuit diagram of the embodiment shown in FIG. 13.

In this embodiment, the contact arrays and conducting segments may alternatively be arranged in another manner. Referring now to FIGS. 13 and 14, contact arrays 600, 602, 604 and 606 are carried on a non-conducting base. Each contact array comprises eleven resilient upwardly biased contact fingers 608, arranged in two sets 610 and 612, set 610 comprising four and set 612 comprising seven contact fingers. A pair of conducting segments 616 and 618 correspond to contact array 600, and similar pairs of conducting segments correspond to the other arrays. As described for the preceding embodiment, normally open switches 622, 624, 626 and 628 prevent actuation of the word indicator 601 in the absence of a complete set of letter cards; letter indicators 630, 632, 634 and 636 are actuated successively by correctly chosen letter cards; and normally closed switches 638, 640 and 642 provide current paths to word indicator 601. The coded element and control arrays are, as in the preceding embodiment, disposed to meet when the cards are in use, but the apertures are disposed in a linear array rather than a rectangular one. In other respects the operation of the invention is not changed. The particular advantage of this arrangement is that it permits the control arrays with their corresponding visible indicia to be provided, if desired, on a continuous roll, extending between the contact arrays and corresponding conducting segments, and being manually advanced in the direction indicated by the arrow 603. In this motion the control apertures may be moved smoothly over the contact points of the contact arrays. Letter cards are inserted as previously described.

Alternatively, the signal employed in this embodiment may be light, as previously described for the "ING" embodiment, with sequences of cooperating light sources and photocells.

While the embodiments described here are particularly intended for the teaching of spelling and reading, it will be appreciated that, by altering the visible indicia, the same devices could be used for other, more abstract tasks, such as, for example, selecting elements belonging to a particular set, which would help to teach concepts involved in mathematical thought. It will also be obvious that the arrays need not be superimposed, but could be positioned to permit a set of conductors to connect the respective arrays.

What is claimed is:

1. A device for matching at least one desired element unit to a control unit comprising signal generating means, at least one control unit for determining said desired elements, said control unit providing visible control indicia and being generally impermeable to said signal, and providing at least one coded control array, each said control array determining at least one said desired element and providing at least one control aperture permeable to said signal;

at least one element unit, generally impermeable to said signal, designating a single element, providing visible element indicia and a coded element array, and adapted to be used by disposing said element array in a fixed position and orientation for cooperation with a said control array, said control indicia and said element indicia remaining visible while said element unit is in use;

alignment means for accurately positioning said element unit with respect to said control unit, said coded element array providing at least one element aperture permeable to said signal and adapted to cooperate with a said control aperture to form a coincident path permeable to said signal when said element unit is used, the said element apertures of a said element unit being disposed to form a unique coded pattern representing said designated single element;

the said control apertures of a said control array being disposed to form a coded pattern adapted to correspond with at least one said unique pattern and thereby to at least one said desired element;

means extending through said path for directing at least one said signal towards each said control array, and cooperating signal receiving and indicator means for receiving a said signal that has traversed at least one said continuous path, whereby, when a said element unit representing a said desired element is used, the said element aperture coded pattern corresponds with at least part of the cooperating said control aperture coded pattern to form at least one said continuous path, permitting a said signal to be received by said receiving means.

2. The device of claim 1 wherein said control unit provides one said control array determining at least one said desired element, a set of said elements representing the set of letters in an alphabet are provided, said visible control indicia are visible letters representing a portion of a word spelled in said alphabet, each said element unit represents a single said letter in said alphabet, said visible element indicia is a visible representation of said letter, and desired said letters are those that combine with said word portion to form a complete word spelled in said alphabet.

3. A device as claimed in claim 1, wherein said means extending through said path is a resilient contact element.

4. Card selection system for selecting corresponding similarly coded control and element cards from sets thereof comprising a base having an array of contacts providing signal directing means, a control card having a coded array sequence of apertures and visible indicia, an element card having a coded array sequence of apertures and visible indicia, said base having aligning means aligning said control and said element cards with the coded array sequence of said element card meeting a control card coded array in turn meeting said base contact array for recognition of coincidently coded arrays of said control and element cards and with their visible indicia spaced from one another for simultaneous display thereof, signal regulating means on said base responsive to the presence of said control and element cards aligned to said aligning means, and signal receiving and indicator means for recognition of said coincidently coded arrays.

5. A system as claimed in claim 4 wherein said array of contacts include resilient contact elements extending directly through meeting apertures to operate said signal receiving and indicator means.

6. Card selection system for selecting corresponding similarly coded control and element cards from sets thereof, comprising a base having an array of electrical contacts providing signal directing means, a control card having a plurality of coded array sequences of apertures and visible indicia, a plurality of element cards each having a coded array sequence of apertures and visible indicia, said base having aligning means aligning said control and said element cards with the coded array sequence of each said element cards meeting a control card coded array in turn meeting said base contact array for recognition of coincidently coded arrays of said control and element cards and with their visible indicia spaced from one another for simultaneous display thereof, signal regulating means on said base responsive to the presence of said control card and sequentially responsive to the presence of said element cards aligned to said aligning means, and electrically actuated signal receiving and indicator means for recognition of said coincidently coded arrays.

7. A system as claimed in claim 6, wherein said base aligning means aligns said control and said element cards with said element coded array sequence superimposed upon a control card array in turn superimposed upon said base contact array.

8. A device for selecting desired elements from a set of possible elements and for arranging said selected elements in a desired sequence, comprising
   a non-conducting base, carrying a sequence of contact arrays, each said contact array providing at least two sets of electrical contacts, the contacts of each said set being electrically connected to each other but electrically insulated from the contacts of every other said set within each said contact array, and a said set in each said contact array being electrically connectable to a said set in each adjacent contact array in said sequence,
   a source of electrical potential connectable to a first said set of contacts in the first said contact array in said sequence of contact arrays,
   an electrically actuated indicator connectable between a last said set of contacts in the last said contact array in said sequence and said source of electrical potential,
   non-conducting support means, carrying at least one sequence of electrically conducting segments insulated from one another,
   each said contact being resiliently biassed towards a said conducting segment for normal engagement of a portion of said segment,
   a said conducting segment enabling electrical connection between two said insulated sets of contact points within a said contact array, and said conducting segments together enabling an electric circuit to be completed through said source of potential, said sequence of contact arrays, and said indicator,
   a removable non-conducting master card visibly designating said desired sequence of said desired elements and having a corresponding sequence of coded control arrays, said master card being adapted to be used by disposing each said control array adjacent a said contact array and at least one corresponding said conducting segment, said designation being visible while said master card is in use,
   each said coded control array providing not less than two apertures each disposed to enable engagement of a said conducting segment by a contact point when said master card is in use,
   a set of removable non-conducting element cards each visibly designating a single element in said set of possible elements and providing a coded element array, and adapted to be used by disposing said element array adjacent a said control array, said designation being visible while said element card is in use,
   said coded element array providing not less than two apertures each disposed to enable engagement of a said conducting segment by a contact point,
   each said element array having its said apertures disposed in a unique pattern representing said designated single element in said set of possible elements, and each said control array having its apertures disposed in a pattern identical to said unique pattern of one desired said element array,
   whereby, when said master card is in use, the use of a sequence of said element cards representing said desired sequence of elements, each said element card providing a said pattern of apertures identical with said pattern of apertures of each corresponding said control array, enables engagement of said conducting segments by said contact points and thereby enables said indicator to be actuated.

9. Card selection system for selecting corresponding similarly coded control and element cards from sets thereof, comprising
   a base having an array of resilient contact elements providing signal directing means,
   a control card having a plurality of coded array sequences of apertures and visible indicia,
   an element card having an array sequence of apertures and visible indicia,
   said base having aligning means aligning said control and said element cards with their visible indicia spaced from one another for simultaneous display thereof and with the coded array sequence of said element card meeting a control card coded array, said element and control arrays then jointly meeting said base contact array for recognition of coincidently coded arrays of said control and element cards when at least some of said element apertures are aligned with at least some of said control apertures to form coincident paths, with at least some of said resilient contact elements extending directly through said meeting apertures along said paths and in displaced positions relative to other of said contact elements, and
   signal receiving and indicator means responsive to the positions of said contact elements for recognition of said coincidently coded arrays.

10. A device for matching at least one desired element unit to a control unit comprising
   at least one control unit for determining said desired elements, said control unit providing visible control indicia, and providing at least one coded control array, each said control array determining at least one said desired element unit,
   a set of element units representing the set of letters in an alphabet, each said element unit representing a single said letter in said alphabet, and providing visible element indicia and a coded element array,
   said visible control indicia being visible letters representing a portion of a word spelled in said alphabet,
   and said visible element indicia being visible representations of said letters, and desired said letters being those that combine with said word portion to form a complete word spelled in said alphabet,
   alignment means for accurately positioning said element unit with respect to said control unit,
   means for directing at least one said signal towards each said control array, and cooperating signal receiving and indicator means,
   said means for directing said signal and said cooperating signal receiving means comprising
   a current source,
   a contact array, providing at least two sets of electrical contact points, the points of each set being electrically connected to each other but electrically insulated from the points of every other said set, said current source being connected to a first said set of contact points, and said indicator being connected to a last said set of contact points,
   at least one electrically conducting segment,
   each said contact point being resiliently biassed towards a said conducting segment for normal engagement of a portion of said segment,
   each said segment normally providing electrical connection between two said insulated sets of contact points within a said contact array and normally enabling an electric circuit to be completed through said current source, said contact array, and said indicator,
   each said element unit being a non-conducting card, adapted to be used by disposing said coded element array adjacent a said coded control array, said element array providing an even number, not less than two, of element apertures, said element apertures being disposed to enable engagement of a said conducting segment by a contact point from each of at least two said sets of contact points within said contact array,
   the said element apertures of a said element unit being disposed to form a unique coded pattern representing said designated single element,
   said control unit being a non-conducting card, adapted to be used by disposing said control array between said contact array and said conducting segments, said control array providing an even number, not less than two, of control apertures, said control apertures being disposed to enable engagement of a said conducting segment by a contact point from each of at least two sets of contact points when said control card is in use, the said control apertures of a said control array being disposed to form a coded pattern adapted to correspond with at least one said unique pattern and thereby to at least one said desired element, whereby when said control card is used, the use of an element card representing a said desired letter provides a said element aperture pattern corresponding with at least part of said control aperture pattern and enables engagement of said conducting segments by said contact points, completing an electric circuit and causing said indicator to be actuated.

11. A device for matching at least one desired element unit to a control unit comprising at least one control unit for determining said desired elements, said control unit providing visible control indicia and providing at least one coded control array, each said control array determining at least one said desired element unit, a set of element units representing the set of letters in an alphabet, each said element unit representing a single said letter in said alphabet, and providing visible element indicia and a coded element array, said visible control indicia representing a word to be spelled in said alphabet, said visible element indicia being visible representations of said letters, and desired said letters being those that combine to form the complete word designated by said control indicia spelled in said alphabet, alignment means for accurately positioning a said element unit with respect to said control unit, means for directing at least one said signal towards each said control array, and cooperating signal receiving and indicator means, said means for directing said signal and said cooperating signal receiving means comprising a current source, a contact array, providing at least two sets of electrical contact points, the points of each said set being electrically connected to each other but electrically insulated from the points of every other said set, said current source being connectable to a first said set of contact points, and said indicator being connectable to a last said set of contact points, at least one electrically conducting segment, each said contact point being resiliently biased towards a said conducting segment for normal engagement of a portion of said segment, a said segment normally providing electrical connection between the two said insulated sets of contact points within a said contact array, each said element unit being a non-conducting card, adapted to be used by disposing said coded element array adjacent a said coded control array, said element array providing not less than two element apertures, said element apertures being disposed to enable engagement of a said conducting segment by a contact point from each of the two said sets of contact points within said contact array, the said element apertures of a said element unit being disposed to form a unique coded pattern representing said designated single element, said control unit being a non-conducting card, adapted to be used by disposing said control array between said contact array and said conducting segments, said control array providing not less than two control apertures, said control apertures being disposed to enable engagement of a said conducting segment by a contact point from each of two sets of contact points when said control card is in use, the said control apertures of a said control array being disposed to form a coded pattern adapted to correspond with at least one said unique pattern and thereby to at least one said desired element, whereby when said control card is used, the use of an element card representing a said desired letter provides a said element aperture pattern corresponding with at least part of said control aperture pattern and enables engagement of said conducting segments by said contact points, completing an electric circuit and causing said indicator to be actuated.

12. A device for matching at least one desired element unit to a control unit comprising signal-directing means and cooperating signal receiving means comprising at least one extended light source and at least one cooperating light receiving device, at least one control unit for determining said desired element units, said control unit being a generally opaque card providing visible control indicia, and providing at least one coded control array, each said control array determining at least one said desired element unit and providing at least one control aperture transparent to visible light, said visible control indicia representing a word to be spelled, a set of said element units representing the set of letters in an alphabet and providing visible representations of said letters, and desired said letters being those that combine with said word portion to form a complete word spelled in said alphabet, each said element unit representing a single said letter in said alphabet, and being a generally opaque card providing a coded element array, and adapted to be used by disposing said element array adjacent a said control array, said control indicia and said element indicia remaining visible while said element unit is in use, said coded element array providing at least one elemnt aperture transparent to visible light and adapted to cooperate with a said control aperture to form a continuous path permeable to said light when said element unit is used, the said element apertures of a said element unit being disposed to form a unique coded pattern representing said designated single element, the said control apertures of a said control array being disposed to form a coded pattern adapted to correspond with at least one said unique pattern and thereby to at least one said desired element, alignment means for accurately positioning said element unit with respect to said control unit, whereby, when a said element unit representing a said desired element is used, the said element aperture coded pattern corresponds with at least part of the cooperating said control aperture coded pattern to form at least one continuous path, permitting a said light signal to be received by said light receiving device.

13. A device for matching a desired sequence of element units to a control unit comprising signal current generating means, signal current directing means and cooperating signal current receiving and indicator means, at least one control unit for determining said desired sequence of said element units, said control unit being generally non-conductive, and providing visible representation of a word to be spelled and a sequence of control arrays, each said control array determining a single desired element unit in said desired sequence, a set of element units representing the set of letters in an alphabet, each said element unit being generally non-conductive and providing a coded element array and visibly designating a single said letter in said alphabet, alignment means for accurately positioning said element unit with respect to said control unit, said signal current directing means and cooperating receiving means comprising a sequence of contact arrays, each said contact array providing at least two sets of electrical contact points, the points of each said set being electrically connected to each other but electrically insulated from the points of every other said set within each said contact array, and each said contact array being electrically connectable to a said set in each adjacent contact array in said sequence, said current generating means being connectable to a first said set of contact points in the first said control array in said sequence, and said indicator means being connectable to a last said set in the last said control array in said sequence, at least one sequence of electrically conducting segments insulated from one another, resilient support means for each said contact point, biassing said point towards a said conducting segment for normal engagement of a portion of said segment, a said conducting segment enabling electrical connection between two said insulated sets of contact points within a said contact array, and said conducting segments together enabling an electric circuit to be completed through said current generating means, said sequence of contact arrays, and said indicating means, each said control unit being adapted to be used by disposing each said control array adjacent a said contact array and at least one corresponding said conducting segment, each said control array providing not less than two apertures each disposed to enable engagement of a said conducting segment by a contact point when said control card is in use, each said element unit being adapted to be used by disposing said element array adjacent a said controlling array, said representation of a word and said designated letter remaining visible while said element unit is so used, and providing not less than two apertures each disposed to enable engagement of a said conducting segment by a contact point when said element is in use, the said apertures being disposed to form a unique coded pattern corresponding to said designated single letter element, and the said apertures of a said control array being disposed to form a coded pattern corresponding with at least one said element array, whereby, when a said control unit is in use, the use of a sequence of element units each representing a desired said letter provides a sequence of said letter aperture patterns corresponding with said sequence of control aperture patterns and enables engagement of said conducting segments by said contact points, completing said electric circuit and actuating said indicator means.

14. A device for matching a sequence of desired letters to a control word unit designating a word, comprising signal light generating means, at least one control word unit for determining said sequence of desired letters, said control word unit providing visible representation of said word and being generally opaque and providing a sequence of coded control arrays, each said control array determining a single desired letter and providing at least one control area transparent said signal light, a set of letter units, representing the letters of an alphabet, generally opaque, each said letter unit designating a single letter, providing visible representation of said letter and a coded letter array, and adapted to be used by disposing said letter array adjacent a said control array, said word representation and said letter representation remaining visible while said letter unit is in use, alignment means for accurately positioning said letter unit with respect to said control word unit, said coded letter array providing at least one letter area transparent to said signal light and adapted to cooperate with a said control area to form a continuous path transparent to said signal light when said letter unit is used, the said letter areas of a said letter unit being disposed to form a unique coded pattern representing said designated single letter, the said control areas of a said control array being disposed to form a coded pattern adapted to corespond with at least one said unique pattern and thereby to at least one said desired letter, signal directing means and cooperating signal receiving means comprising a sequence of transmitter-receiver units, each said unit corresponding with a said control array when said control unit is in use, and each said unit comprising at least one extended light source disposed to direct said visible light toward at least a portion of a said corresponding control array, and at least one cooperating light receiving device, whereby, when a said letter unit representing a said desired letter is used, the said letter area coded pattern corresponds with at least part of the cooperating said control area coded pattern to form at least one continuous path for said signal light, permitting a said signal to be received by said receiving means.

* * * * *

UNITED STATES PATENT OFFICE
CERTIFICATE OF CORRECTION

Patent No. 3,659,356          Dated May 2, 1972

Inventor(s) Roy A. Nelson

It is certified that error appears in the above-identified patent and that said Letters Patent are hereby corrected as shown below:

On the cover sheet insert -- [73] Assignee Spellbinder, Inc., Boston, Mass., a corporation of Massachusetts --.

Signed and sealed this 12th day of December 1972.

(SEAL)
Attest:

EDWARD M. FLETCHER, JR.          ROBERT GOTTSCHALK
Attesting Officer                Commissioner of Patents